United States Patent [19]

Morita

[11] Patent Number: 4,774,922
[45] Date of Patent: Oct. 4, 1988

[54] SPARK IGNITION TIMING CONTROL SYSTEM FOR SPARK IGNITION INTERNAL COMBUSTION ENGINE WITH QUICKER ADVANCE OF SPARK ADVANCE IN TRANSITION FROM ANTI-KNOCK MODE TO MBI MODE CONTROL OPERATION

[75] Inventor: Tatsuo Morita, Kanagawa, Japan
[73] Assignee: Nissan Motor Company, Limited, Yokohama, Japan
[21] Appl. No.: 109,827
[22] Filed: Oct. 16, 1987
[30] Foreign Application Priority Data
Oct. 17, 1986 [JP]   Japan .................................. 61-247172
Dec. 23, 1986 [JP]   Japan .................................. 61-307213
[51] Int. Cl.$^4$ ............................................. F02P 5/14
[52] U.S. Cl. ..................................... 123/425; 123/416
[58] Field of Search ................. 123/425, 416, 406; 310/322; 73/35, 660

[56] References Cited
U.S. PATENT DOCUMENTS

| | | | |
|---|---|---|---|
| 4,374,472 | 2/1983 | Nishimura .............................. | 73/35 |
| 4,711,213 | 12/1987 | Sakakibara et al. ................. | 123/425 |
| 4,711,214 | 12/1987 | Sakakibara et al. ................. | 123/425 |
| 4,715,342 | 12/1987 | Nagai .................................... | 123/425 |
| 4,716,873 | 1/1988 | Takaba et al. ....................... | 123/425 |

*Primary Examiner*—Raymond A. Nelli
*Attorney, Agent, or Firm*—Foley & Lardner; Schwartz, Jeffery, Schwaab, Mack, Blumenthal & Evans

[57] ABSTRACT

A spark ignition timing control system takes a feature of storing spark advance angle data in MBT mode upon switching control mode from MBT mode to anti-knock level exceeding a predetermined level. The stored spark advance angle is read and set as initial spark advance angle upon resuming MBT mode control after anti-knock mode control. It may also be possible to vary the spark advance angle value to be used as initial spark advance angle in resumption of the MBT control according to variation of the spark advance angle in anti-knock mode control. Variation of the stored advance angle according to regarding magnitude of the spark advance in anti-knock mode will prevent the spark ignition timing control from causing hunting in switching of the control mode.

25 Claims, 14 Drawing Sheets

SPARK IGNITION TIMING CONTROL SYSTEM FOR SPARK IGNITION INTERNAL COMBUSTION ENGINE WITH QUICKER ADVANCE OF SPARK ADVANCE IN TRANSITION FROM ANTI-KNOCK MODE TO MBI MODE CONTROL OPERATION

BACKGROUND OF THE INVENTION

1. Field of the Invention

The present invention relates generally to a spark ignition timing control system for an automotive internal combustion engine, which performs ignition timing control operation in both of anti-knock mode and a mode gradually or in stepwise advancing a spark advance toward a minimum advance for best torque (MBT) point. The control mode in which spark advance is advanced toward MBT point will be hereafter referred to as 'MBT mode'. More specifically, the invention relates to spark ignition timing control system which accomplish both of suppressing of engine knocking beyond a predetermined level and an improved engine performance with improved transition characteristics during switching of operation mode from anti-knock mode to MBT mode.

2. Description of the Background Art

As is well known, performance of an automotive internal combustion engine becomes optimum when spark ignition is performed near MBT point, in view of fuel economy. As is also well known, the engine performance may be optimum when the engine knocking level is maintained at trace knock level. Therefore, in order to obtain optimum engine performance, spark advance is to be adjusted toward the MBT point. On the other hand, under certain engine driving condition, such as full load condition for acceleration, engine knocking level tends to be greater than the trace knocking level. As is well known, excessive engine knocking is quite harmful for the engine and tends to give a damage for the engine per se. Therefore, anti-knock spark ignition timing control becomes necessary for suppressing engine knocking. It is usual manner of anti-knock spark ignition timing control to retard spark advance gradually or in stepwise until the engine knocking level becomes lower than or equal to a predetermined level which substantially correspond to the allowable trace knocking level.

In view of the above, the spark ignition timing control is generally performed for seeking the optimum timing where the engine knocking level is maintained at the trace knocking level and the spark advance is advanced toward the MBT point as close as possible. Anti-knock mode control is always given higher priority than the MBT mode control since the engine knocking has to be suppresed regardless of the engine performance when substantial engine knocking occurs. In this viewpoint, it is usual manner of spark ignition timing control to advance the spark advance in MBT mode at smaller rate than rate of retarding the spark advance in anti-knock mode. Such spark ignition timing control system has been disclosed in the Japanese Patent First (unexamined) Publication (Tokkai) Showa 58-82074, For example. In the system disclosed in the above-identified Japanese Patent First Publication, the spark ignition timing is normally controlled in MBT mode so as to obtain optimum engine performance can be obtained with maximum engine output torque. For this purpose, in MBT mode control, the spark ignition timing is so adjusted as to perform spark ignition at a crank shaft angular position where the pressure in the engine combustion chamber is obtained will be hereafter referred to as 'maximum pressure point $\theta_{pmax}$'. The system also monitors engine knocking condition for detecting the engine knocking in excess of a given level in order to perform anti-knock mode control in response thereto. As set forth above, in the anti-knock mode control, the spark advance is retarded gradually or in stepwise until the engine knocking level can be lowered across the predetermined level. When the anti-knock control is successfully terminated, then MBT control is resumed to advance the spark advance gradually from the retarded angle in the anti-knock mode operation.

In such spark ignition timing control, recovery of the engine performance in the transition from Anti-knock mode control to MBT mode control is rather slow because the rate of advancing of the spark advance in the MBT mode control is much smaller than the rate of retarding of the spark advance in anti-knock mode control. This maintains the engine performance at low level for a long period of time after successfully suppressing the excessive level of engine knocking. This clearly degrade the engine drivability and fuel economy.

In addition, when engine knocking cannot be suppressed even by anti-knock mode control to retard spark advance for substantial magnitude, engine performance will becomes unacceptable low. In addition, excessively retarded spark advance may results in rising of the exhaust gas temperature to give damage for catalyst in the engine exhaust system.

SUMMARY OF THE INVENTION

Therefore, it is a principle object of the present invention to provide a spark ignition timing control system which has improved transition characteristics in switching control mode from anti-knock mode to MBT mode for solving the drawback in the background art as set forth above.

Another object of the present invention is to provide a spark ignition timing control system which can recover the engine performance after terminating anti-knock mode control, at earlier timing.

In order to accomplish the aforementioned and other objects, a spark ignition timing control system, according to the present invention, takes a feature of storing spark advance angle data in MBT mode upon switching control mode from MBT mode to anti-knock level exceeding a predetermined level. The stored spark advance angle is read and set as initial spark advance angle upon resuming MBT mode control after anti-knock mode control.

It may also be possible to vary the spark advance angle value to be used as initial spark advance angle in resumption of the MBT control according to variation of the spark advance angle in anti-knock mode control. Variation of the stored advance angle according to retarding magnitude of the spark advance in anti-knock mode will prevent the spark ignition timing control from causing hunting in switching of the control mode.

Furthermore, the spark ignition timing control system, according to the present invention, may also take a feature of resumption of the MBT control regardless of the engine knocking level. Such control may be performed when the maximum pressure in the engine combustion chamber is obtained at an angular position which has an angular value smaller than a predetermined angular value representative of a target spark advance position.

According to one aspect of the invention, a spark ignition timing control system comprises first means for causing spark ignition in an engine combustion cylinder in response to a trigger signal, second means for deriving a basic spark advance on the basis of a preselected first engine operation parameter, third means for deriving a first correction value for modifying the basic spark advance so as to adjust a crank shaft angular position, at which a maximum pressure in an engine combustion chamber is obtained, toward a predetermined target angular position, fourth means for deriving a second correction value for retarding the basic spark advance by a predetermined magnitude for suppressing engine knocking, the fourth means, and fifth means for deriving a spark advance on the basis of the basic spark advance and one of the first and second correction value, the fifth means normally selecting the first correction value for modifying the basic spark advance in a first mode and responsive to the engine knocking heavier than a predetermined level to select the second correction value for modifying the basic spark advance in a second mode and to hold the first correction value derived immediately before the engine knocking heavier than the predetermined value is detected, and the fifth means being responsive to resumption of the first mode operation to modify the basic spark advance with the first correction value held during the second mode operation, and the fifth means producing the trigger signal when the crank shaft reaches an angular position identified by the spark advance.

According to another aspect of the invention, a spark ignition timing control system for an automotive internal combustion engine having a plurality of combustion chambers, comprises a crank angle sensor monitoring an angular position of a crank shaft of the engine to produce a crank position signal at every given unit angle of crank shaft angular displacement and a crank reference signal at every predetermined angular position of the crank shaft, a pressure sensor for monitoring pressure in the combustion chambers and producing a pressure indicative signal, a knocking detector receiving the pressure indicative signal and detecting engine knocking level to produce an engine knocking level indicative signal, a detector for detecting preselected basic spark advance control parameter for producing a basic spark advance control parameter indicative signal, first means for causing spark ignition in each of the engine combustion cylinders in order in response to a trigger signal, second means for deriving a basic spark advance on the basis of a preselected basic spark advance control parameter indicative signal value, third means for deriving a first correction value for modifying the basic spark advance so as to adjust a crank shaft angular position, at which a maximum pressure in an engine combustion chamber is obtained, toward a predetermined target angular position, fourth means, active while the engine knocking indicative signal value is maintained greater than a predetermined threshold value, for deriving a second correction value depending upon for retarding the basic spark advance by a predetermined magnitude for suppressing engine knocking, and fifth means for deriving a spark advance on the basis of the basic spark advance and one of the first and second correction value, the fifth means normally selecting the first correction value for modifying the basic spark advance in a first mode and responsive to the engine knocking indicative signal value greater than the threshold value to select the second correction value for modifying the basic spark advance in a second mode and to hold the first correction value derived immediately before the engine knocking indicative signal value greater than the threshold value is detected, and the fifth means being responsive to resumption of the first mode operation from the second mode to modify the basic spark advance with the first correction value held during the second mode operation, and the fifth means producing the trigger signal when the crank shaft reaches an angular position identified by the spark advance.

The third means may derive the first correction value on the basis of a angular difference between the crank shaft angular position and the predetermined target angular position and the first correction value derived in an immediately preceding operation cycle of the third means. In practice, the third means derives the first correction value $\gamma$ by the following equation:

$$\gamma = \gamma_{old} + \Delta\theta/M$$

where
- $_{old}$ is the first correction value derived in an immediately preceding operation cycle of the third means
- $\Delta\theta$ is the angular difference between the crank shaft angular position and the predetermined target angular position and
- M is a constant having a value greater than or equal to zero.

On the other hand, the fourth means may derive the second correction value by reducing a predetermined first value from the second correction value derived in the immediately preceding operation cycle of the fourth means while the engine knocking level is held heavier than the predetermined level and by added a predetermined second value to the second correction value derived in the immediately preceding operation cycle of the fourth means while the engine knocking level is held lower than or equal to the predetermined level. In the practical operation, the second correction value is a negative value, absolute value of which is increased by the first value at every operation cycle of the fourth means while the engine knocking is heavier than the predetermined level and is decreased toward zero while the engine knocking is lighter than or equal to the predetermined level.

The fifth means is resonsive to the second correction value for resuming the first mode operation. On the other hand, the fifth means modifies the held first correction value by a given magnitude at every operation cycle thereof during the second mode operation. In this case, the fifth means is responsive to engine knocking heavier than the predetermined level to reduce the held first correction value by a given third value and to increase the held first correction value by a given fourth value when engine knocking is lighter than or equal to the predetermined level.

In the alternative embodiment, the fifth means compares a first angular value representative of the crank shaft angular position where the maximum pressure in the combustion cylinder is obtained, with a second angular value representative of the crank shaft angular position corresponding to the target spark advance point and swithcing control mode from the second mode to the first mode when the first angular value is smaller than or equal to the second angular value, regardless of the engine knocking level.

DESCRIPTION OF THE PREFERRED EMBODIMENT

Figure 1:
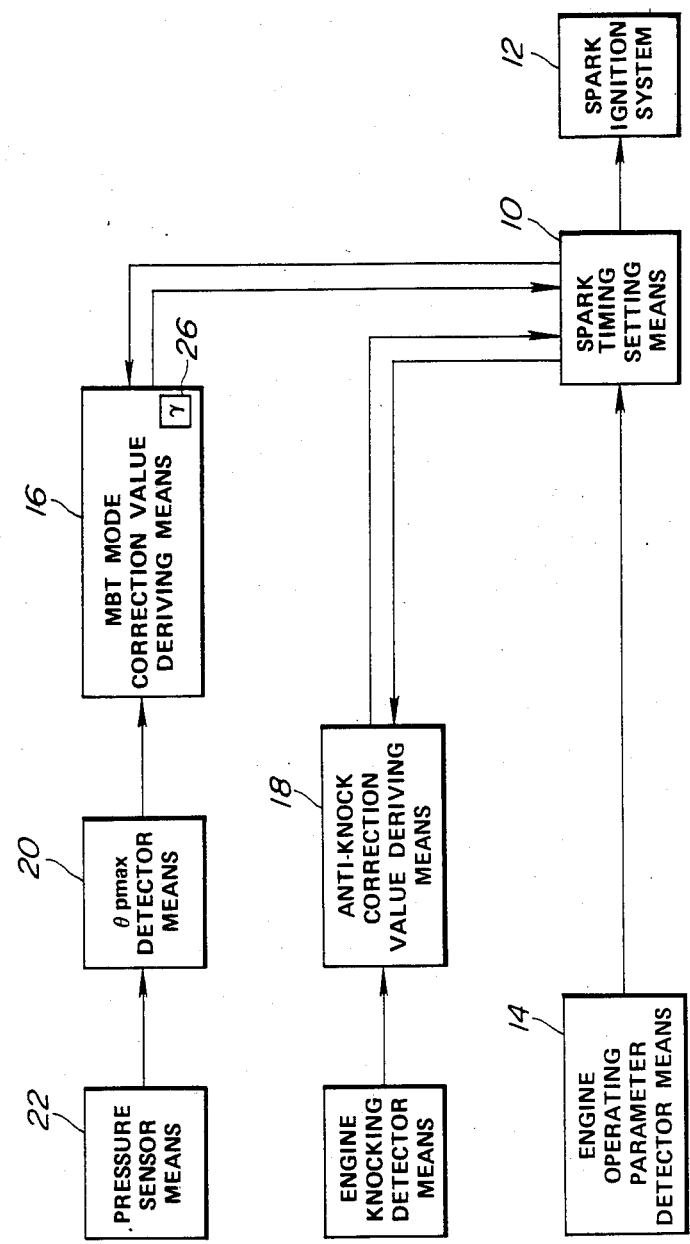
FIG. 1 is a schematic block showing general construction of a spark ignition timing control system according to the present invention, which illustrates fundamental and principle idea of the spark ignition timing control system, of the invention.

Referring now to the drawings, particularly to FIG. 1, the general and fundamental concept of a spark ignition timing control system, according to the present invention is illustrated in a form of functional blocks. As will be seen from FIG. 1, the spark ignition timing control system according to the invention includes a spark timing setting means 10 which is associated with a spark ignition system 12 for controlling ignition timing. As is well known, the spark timing setting means 10 is set a spark advance data and a dwell angle data for determining the ignition timing. Also, the spark timing setting means 10 is associated with an engine operating parameter detector means 14 which includes means for producing a timing signal representative of a crank shaft angular position. Based on the set spark advance data, the dwell angle data and the timing signal value input from the engine operating parameter detector means 14, the spark timing setting means 10 determines the timing for initiating spark ignition.

The engine operating parameter detector means 14 also includes means for detecting engine driving condition, e.g. an engine load condition and an engine speed, which serves as parameter for deriving a basic spark advance value. The parameter for deriving the basic spark advance will be hereafter referred to as "basic spark advance deriving parameter". The engine operating parameter detector means 14 feed the basic spark advance deriving parameter to the spark timing setting means 10. The spark timing setting means 10 derives the basic spark advance on the basis of the basic spark advance deriving parameter.

The spark ignition timing control system according to the present invention performs MBT mode control for advancing the spark advance toward the MBT point, and anti-knock mode control which is performed in response to engine knocking in excess a predetermined level, for retarding the spark advance. In order to perform the aforementioned MBT mode and anti-knock mode spark ignition timing control, the spark ignition timing control system includes a MBT correction value deriving means 16 and an anti-knock correction value deriving means 18. The MBT correction value deriving means 16 is associated with a maximum pressure detector means 20 which is, in turn, connected to a pressure sensor means 22. The pressure sensor means 22 monitors the pressure in an engine cylinder to output a cylinder pressure indicative signal. The maximum pressure detector means 20 receives the cylinder pressure indicative signal and the timing signal for detecting the crank shaft angular position where the maximum pressure in the engine cylinder is detected. The crank shaft angular position where the maximum pressure in the engine cylinder is obtained will be hereafter referred to as "$\theta_{pmax}$ point". The maximum pressure detector means 20 compares the detected $\theta_{pmax}$ point with the MBT point to derive the difference therebetween. The maximum pressure detector means 20 outputs a difference indicative signal. Based on the difference indicative signal, the MBT correction value deriving means 16 derives a MBT correction value. The MBT correction value deriving means 16 outputs the MBT correction value indicative signal to the spark timing setting means 10. The spark timing setting means 10 receives the MBT correction value indicative signal and modifies the basic spark advance with the MBT correction value.

On the other hand, the anti-knock correction value deriving means 18 is connected to an engine knocking detector means 24 which monitors the engine knocking level and produces a knocking indicative signal when the engine knocking higher than a predetermined level is detected. The anti-knock correction value deriving means 18 is responsive to the knocking indicative signal to derive an anti-knock correction value for retarding the spark advance by a given retarding magnitude. The anti-knock correction value indicative signal is fed to the spark timing setting means 10. The basic spark advance as derived on the basis of the basic spark advance deriving parameter is thus modified with the anti-knock correction value.

The control mode in which the spark advance is advanced with the MBT correction value is the MBT mode and the control mode in which the spark advance is retarded with the anti-knock correction value is the anti-knock mode. The spark timing setting means 10 selectively performs the MBT mode control and the anti-knock mode. Namely, as long as the engine knocking level is held below the predetermined level, the spark timing setting means 10 continuously perform the MBT mode control for continuously or cyclically advance the spark advance so that $\theta_{pmax}$ point approaches the MBT point. The control mode is switched from the MBT mode to the anti-knock mode in response to the knocking indicative signal. As soon as the knocking indicative signal disappear, the control mode is again switched to return the MBT mode.

Therefore, spark ignition timing control system according to the invention maintains the engine driving condition at the trace knocking condition where the engine output can be held optimum.

The spark ignition timing control system is particularly characterized by the operation of holding the MBT correction value upon switching of the control mode from the MBT mode to the anti-knock mode and utilize the held MBT correction value upon resumption of the MBT mode spark timing control after termination of the anti-knock mode control. For this, the MBT correction value deriving means 16 detects switching of the control mode between the MBT mode control and the anti-knock mode control. Therefore, the MBT correction value deriving means 16 is connected to the engine knocking detector means 24 to receive therefrom the knocking condition indicative signal. Namely, the MBT correction value deriving means 16 is responsive to the knocking condition indicative signal to hold the instantaneous MBT correction value. On the other hand, the MBT correction value deriving means 16 is response to termination of the knocking condition indicative signal to read out the held MBT correction value to set as the initial MBT correction value upon resumption of the MBT mode control.

For this purpose, the MBT correction value deriving means 16 is provided with a memory or register 26 for temporarily storing the MBT correction value.

By utilizing the MBT correction value immediately preceding switching of control mode from the MBT mode to the anti-knock mode, upon resumption of the MBT mode control operation, the spark advance in the MBT mode control can be quickly advanced to the point immediately before the engine knocking occured. This will clearly improve transition characteristics in switching control mode from the anti-knock mode to the MBT mode.

Figure 2:
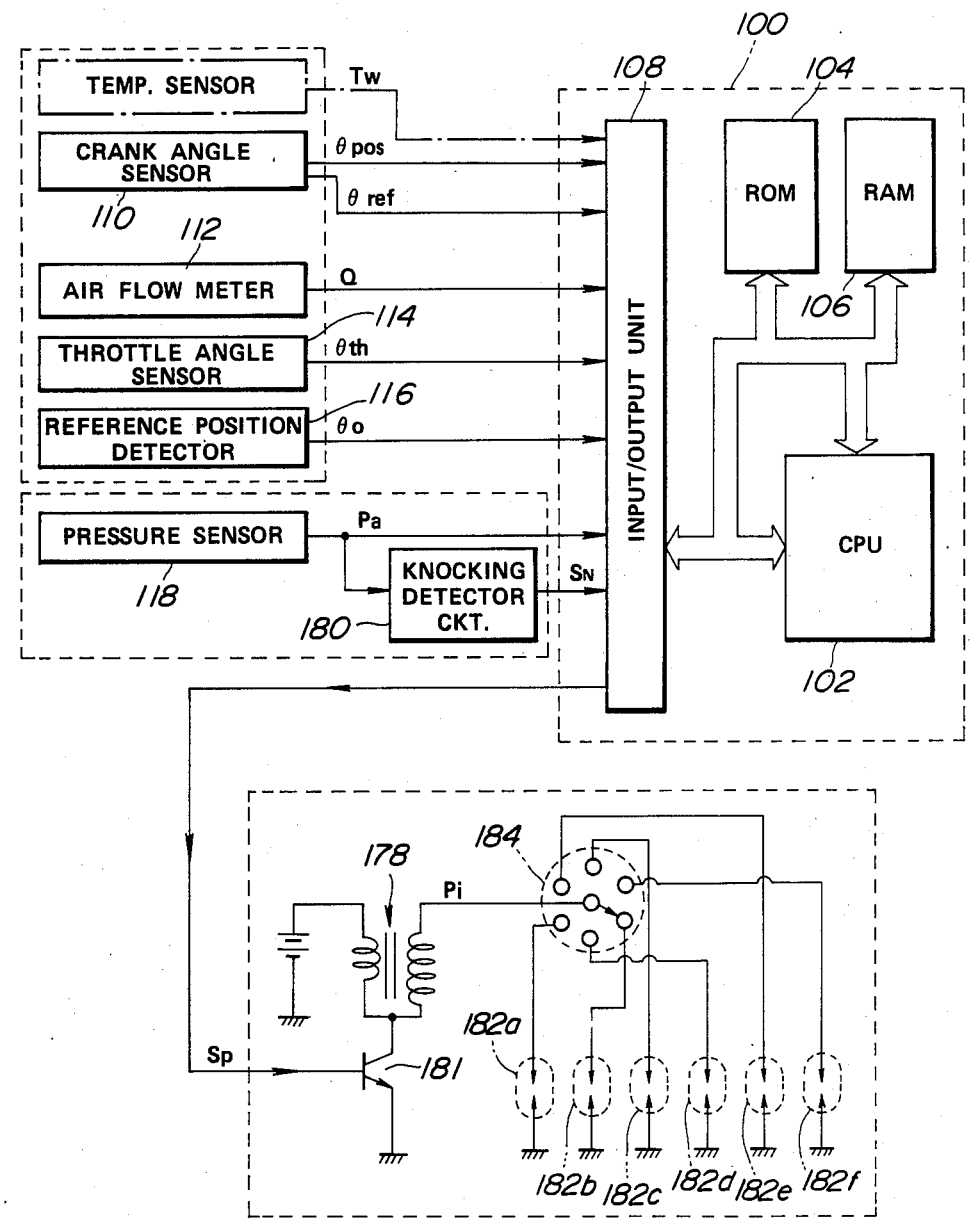
FIG. 2 is a block diagram of the preferred embodiment of a spark ignition timing control system according to the invention.

The detailed construction of the preferred embodiment of the spark ignition timing control system according to the invention will be discussed herebelow with reference to FIGS. 2 through 17. FIG. 2 shows the circuitry of the preferred embodiment of the spark ignition timing control system according to the invention. In practice, the preferred embodiment of the spark ignition timing control system employs a microprocessor-based control unit 100 for monitoring the engine driving condition including the engine knocking condition and deriving the spark advance based on the detected engine operating condition. The control unit 100 comprises CPU 102, ROM 104, RAM 106 and an input-/output unit 108. The input/output unit 108 interfaces various peripheral components of the spark ignition timing control system. Namely, the input/output unit 108 is connected to a crank angle sensor 110, an air flow meter 112, a throttle angle sensor 114, a crank shaft reference position detector 116 and a pressure sensor 118.

As is well known, the crank angle sensor 110 is designed to monitor the angular position of an engine crank shaft to produce a crank position signal $\theta_{pos}$ at every predetermined angular displacement, e.g. 1° or 2°, of the crank shaft, and a crank reference signal $\theta_{ref}$ at every predetermined crank shaft angular displacement, e.g. 180° of the crank shaft angular position for 4-cylinder engine, 120° of the crank shaft angular position for 6-cylinder engine. As is well known, the crank angle sensor 110 is designed to produce the crank reference signal $\theta_{ref}$, a predetermined angle ahead of the top-dead-center TDC of one of the engine cylinder, e.g. 70° BTDC (70° before top dead center).

Figure 3:
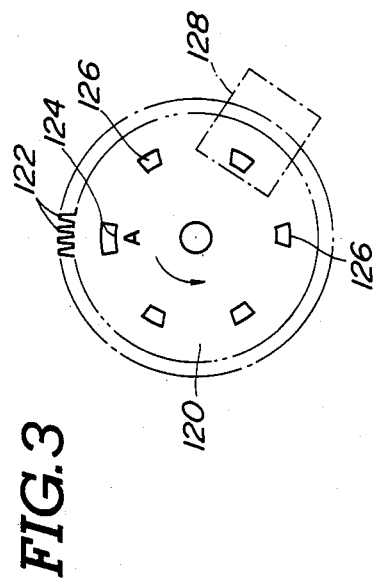
FIG. 3 is an illustration showing detailed construction of a crank angle sensor to be employed in the preferred embodiment of the spark ignition timing control system according to the invention.

In the practical construction, the crank angle sensor 110 comprises a rotary disk 120 associated with a crank shaft for rotating with the crank shaft, as shown in FIG. 3. The rotary disk 120 is designed to rotate with the shaft shaft at a rotation speed half of that of the crank shaft so that rotary disk rotates one turn during one cycle of engine revolution. The rotary disk 120 is formed with a plurality of open crank angle detecting slits 122 on the peripheral edge. The interval of the crank angle detecting slits 122 corresponds to the angular displacement about which the crank position signal $\theta_{pos}$ is produced. On the other hand, the rotary disk 120 is further formed with reference position detecting slits 124 and 126. The reference position detecting slits 124 and 126 are aligned along the circumference of the rotary disk and respectively provided different circumferential width. In the shown embodiment, since the crank angle sensor 110 is designed for monitoring the crank shaft angular position of the 6-cylinder engine, 6 slits 124 and 126 are formed with intervals of 60°. The angular positions of respective reference position detecting slits 124 and 126 correspond BTDC 70° of respectively corresponding engine cylinder. The circumferential width of respective reference position detecting slits 124 and 126 are differentiated to each other. Namely, in the shown example, the reference position detecting slit 124 corresponds to crank shaft angular position of BTDC 70° of the No. 1 cylinder. The crank angle sensor 110 also comprise an optical sensor 128 including two pairs of emitting elements and photo sensing elements. One pair of the light emitting element and the photo sensing element are provided in opposition across the peripheral edge of the rotary disk 120 so that the light beam emitted by the light emitting element can reach the photo sensing element when they oppose one of the crank angle detecting slit 122. On the other hand, the other pair of the light emitting element and the photo sensing element are radially inwardly offset from the aforementioned pair and opposes the rotary disk at the radial position where the reference position detecting slits 124 and 126 are formed. Therefore, the crank reference signal $\theta_{ref}$ is produced by the photo sensing element when one of the reference position detecting slits 124 and 126 opposes the light emitting and photo sensing elements of the other pair.

Figure 4:
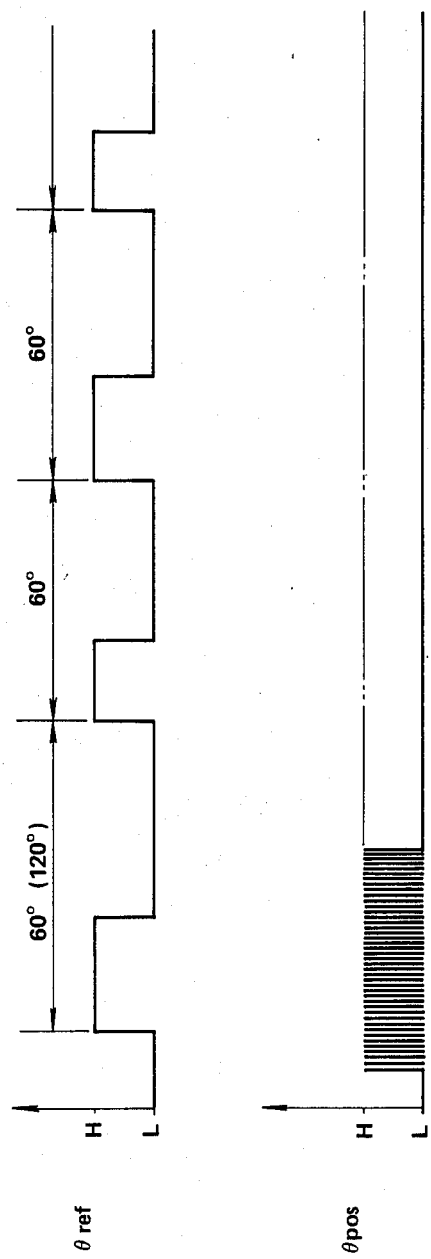
FIG. 4 is a timing chart showing the waveform of the outputs of the crank angle sensor.

As shown in FIG. 4, the crank position signal $\theta_{pos}$ and the crank reference signal $\theta_{ref}$ are rectangular pulse form signals having a pulse width variable depending upon the circumferential width of the slits. the shown embodiment, the reference position detecting slit 124 is provided wider circumferential width than the remaining reference position detecting slit 124. Therefore, by detecting the wider pulse width of the crank reference signal $\theta_{ref}$, the BTDC 70° of the No. cylinder can be detected. This reference position detecting slit 124 and the optical sensor 128 thus serves not only as the crank angle sensor 110 but also the reference position detector 116.

The air flow meter 112 is disposed within an air induction passage of the engine and designed to monitor the air flow rate. The air flow meter 112 produces an intake air flow rate indicative signal Q which, in turn, represents the load condition on the engine. The throttle angle sensor 114 is disposed within a throttle chamber for monitoring angular position of a throttle valve to produce a throttle angle position indicative signal $\theta_{th}$.

Figure 5:
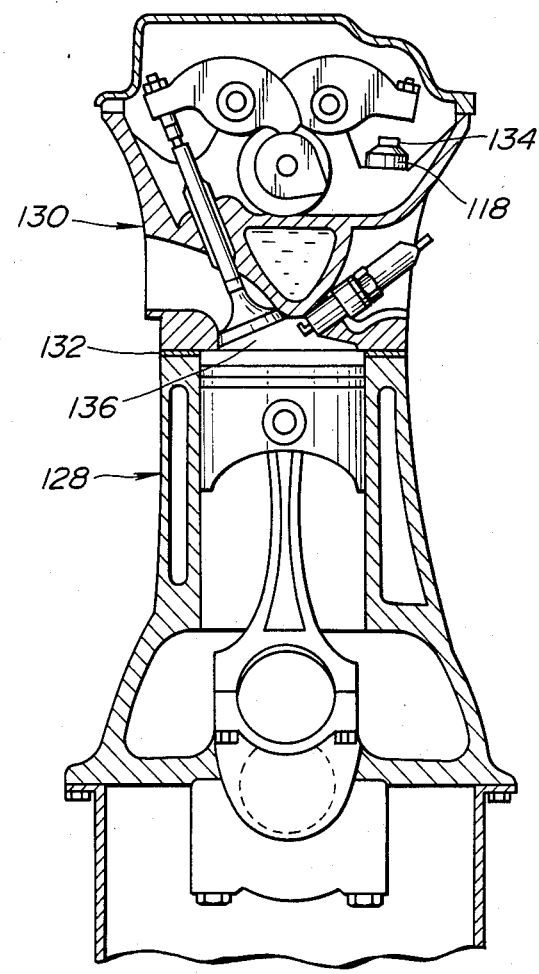
FIG. 5 is a fragmentary illustration of an internal combustion engine to which the preferred construction of the pressure sensor is applied.

The pressure sensor 118 employed in the shown embodiment of the spark ignition timing control system is a washer-type pressure sensor which is built-in the cylinder gasket. As shown in FIG. 5, the washer-type pressure sensor comprises a piezoelectric sensor element 130 which is variable of output voltage depending upon the internal pressure in the engine cylinder. Also the output of the pressure sensor serves to represent the engine knocking condition since the knocking vibration component of the engine cylinder superimposes on the pressure indicative sensor signal Pa. The engine mount-type pressure sensor is not necessarily the washer-type pressure sensor but can be any types. Example of the engine mount-type pressure sensor is shown for the sake of disclosure. The same pressure sensor has been disclosed in the U.S. Pat. No. 4,524,725, issued on June 25, 1985, to Kiyoshi TAKEUCHI and commonly assigned to the assignee of the present invention. The disclosure of the above-identified United States Patent is herein incorporated by reference for the sake of disclosure.

Figure 6:
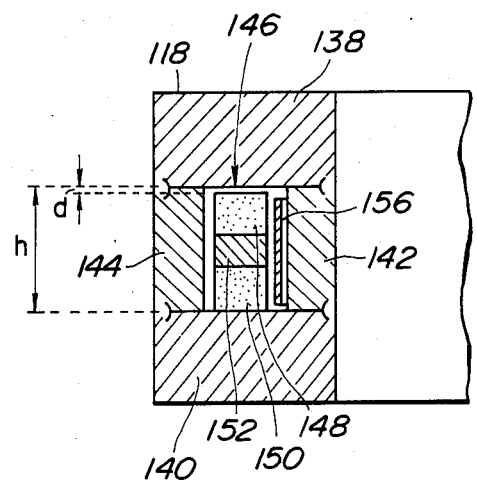
FIG. 6 is cross-section of an engine mount-type pressure sensor for monitoring a pressure in an engine cylinder, which pressure sensor is built in an engine cylinder gasket and employed in the preferred embodiment of a spark ignition timing control system of FIG. 2.
Figure 7:
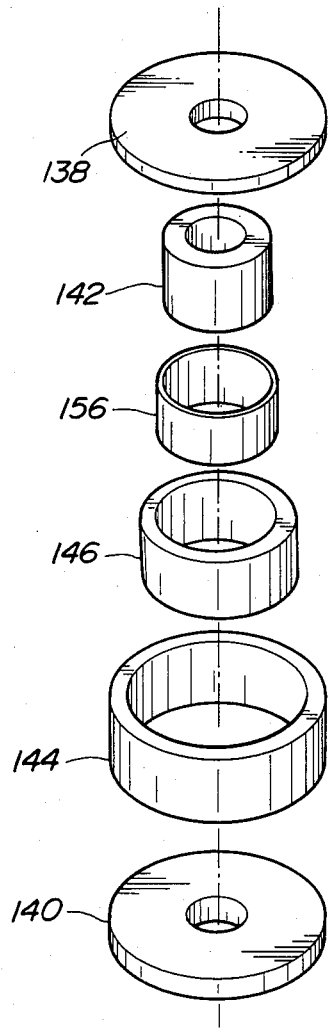
FIG. 7 is an exploded perspective view of the pressure sensor of FIG. 6.

As shown in FIGS. 5, 6 and 7, the waster-typer pressure sensor 118 is disposed between an engine cylinder block 128 and an engine cylinder head 130 as the cylinder gasket 132. As is well known, the cylinder block 128 and the cylinder head 130 are fixed sandwitching the cylinder gasket 132 by means of cylinder head bolts 134. The cylinder block 128 and the cylinder head 130 as assembled define the engine combustion chambers 136. As shown in FIGS. 6 and 7 in detail, the pressure sensor 118 includes a casing or body having a pair of upper and lower metal discs 138 and 140 aligned and separated axially. There discs 138 and 140 both have central bores accomodating the cylinder head bolt. The body of the pressure sensor 118 has concentrically arranged inner and outer rings 142 and 144 interposed coaxially between the disks 138 and 140. There rings 138 and 140 have equal axial dimensions, which match the separation of the discs 138 and 140. The rings 142 and 144 are radially spaced to define an annular inside space in conjunction with the discs 138 and 140. The rings 142 and 144 are made of relatively rigid metal, such as steel. Upper face of the rings 142 and 144 are welded to the lower face of the upper disc 138. The central bore of the inner ring 124 is designed to accomodate the cylinder head bolt.

A ring-shaped sensing member 146 is disposed in the inside space coaxially with respect to the discs 138 and 140. The sensing member 146 includes axially aligned ring-shaped electro-mechanical tranducing member 148 and 150, such as ceramic piezoelectric elements, and a ring electrode 152 contacts and is attached to the upper face of the lower piezoelectric element 150. The piezoelectric elements 148 and 150 are oppositely polarized in the axial direction so that the faces of the piezoelectric elements in contact with the electrode 152 have equal porality.

The sensing member 154 is spaced radially from both of the rings 142 and 144, so that the electrode 152 is electrically insulated from the rings 142 and 144. An insulating tube 156 is disposed in the section of the inside space between the sensing member 156 and the inner ring 142 in order to ensure the electrical insulation between the electrode 152 and the inner ring 142. A terminal (not shown) is mounted on the outer cylindrical surface of the outer ring 144. Leads (not shown) extend from the electrode 152 to the terminal through a radial hole (not shown) in the outer ring 144 in order to electrically connect the electrode 152 and the terminal. The leads are electrically insulated from the outer ring 144 by insulating material (not shown) covering them. The lower face of the lower piezoelectric element 150 contacts and is attached to the upper face of the lower disc 140. The lower piezoelectric element 150 serves to produce an electrical signal or voltage between the lower disc 150 and the electrode 152.

The upper piezoelectric element 148 of the sensing member 146 is spaced axially from the upper disc 138 by a predetermined clearance 158 in its original condition where the pressure sensor 118 is detached from the bolt 134 extends through the central bores of the discs 138 and 140, and the inner ring 142. The top surface of the pressure sensor 118 contacts the head of the bolt 134. The bottom surface of the pressure sensor 118 contacts the cylinder head 132. In this way, the pressure sensor 118 is clamped between the bolt 106 and the cylinder head 132.

It should be appreciated that the specific construction of the pressure sensor has been disclosed in terms of the preferred embodiment of the invention, various constructions of the pressure sensor may be employed in the spark ignition timing control system for implementing the present invention. Therefore, the shown embodiment of the pressure sensor should be regarded as mere example showing the practical construction of one of the pressure sensors which are applicable for the preferred embodiment of the spark ignition timing control system according to the invention.

Figure 8:
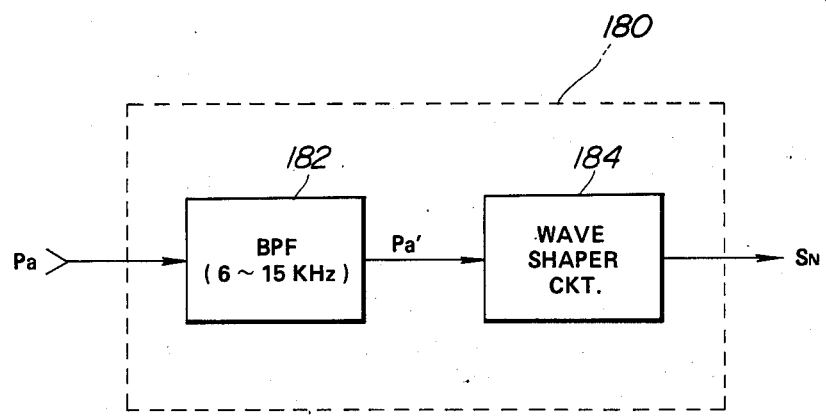
FIG. 8 is a block diagram of an engine knocking detector circuit employed in the preferred embodiment of the preferred embodiment of the spark ignition timing control system according to the invention, which engine knocking detector circuit monitors engine knocking level for detecting engine knocking requiring anti-knock mode ignition timing control.
Figure 9:
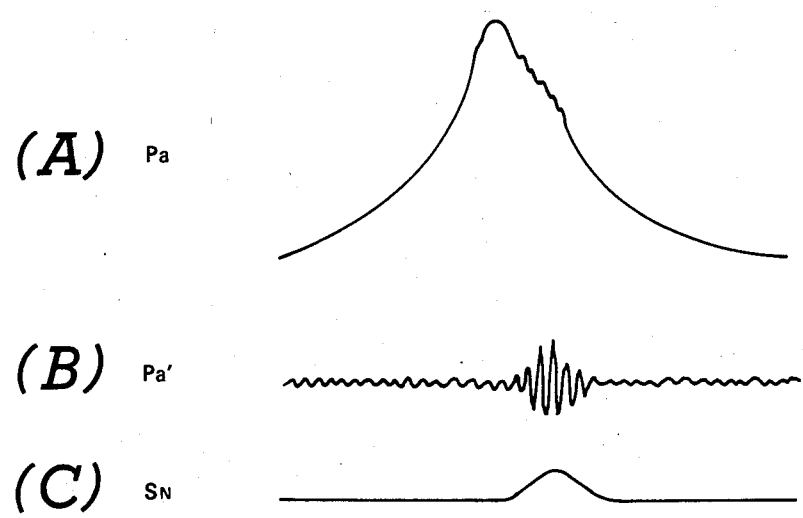
FIG. 9 is a timing chart showing waveforms of input and output of respective components of the k=engine knocking detector circuit of FIG. 8.

As shown in FIG. 2, the output of the pressure indicative sensor signal is directly fed to the input/output unit 108 as a combustion chamber pressure data indicative data and fed to a knock detector circuit 180. As shown in FIG. 8, the knock detector circuit 180 comprises a band-pass filter 182 and a wave-shaper circuit 184. The band-pass filter 182 is designed to pass a specific frequency range of the pressure indicative signal Pa, which frequency range is selected in a frequency range where engine knocking vibration occurs. In practice, the band-pass filter 182 is set to pass 6 top 15 KHz frequency range of the pressure indicative signal as shown in FIG. 9(B). The wave-shaper circuit 184 shapes the filtered pressure indicative signal Pa' to obtain a knocking condition indicative signal $S_N$ which is envelop component of the filted pressure indicative signal Pa', as shown in FIG. 9(C). The knocking condition indicative signal of the wave shaper circuit 184 is fed to the input/output unit 108 as the engine knocking condition indicative data.

As shown by phantom line in FIG. 2, the spark ignition timing control system may further includes an engine or an engine coolant temperature sensor for monitoring the engine or engine coolant temperature to produce an engine or engine coolant temperature indicative signal Tw. The engine coolant temperature indicative signal Tw may serves as a correction factor for correcting the basic spark advance to be determined based on the engine speed N and the engine load condition Q.

Figure 10:
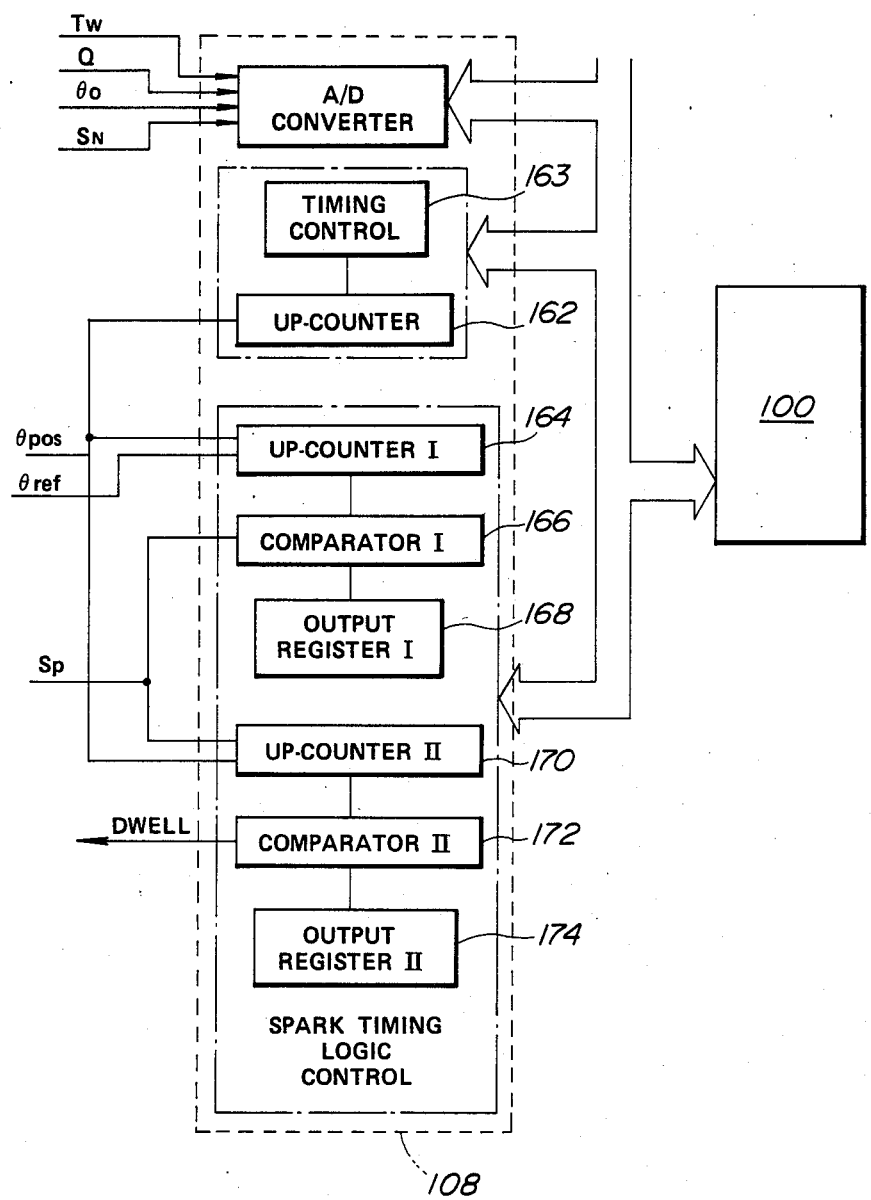
FIG. 10 is a discrete form block diagram of an input/output unit to be employed in the preferred embodiment of the spark ignition timing control system of FIG. 2.

As shown in FIG. 10, the input/output unit 108 includes an analog-to-digital (A/D) converter for converting analog signals from the air flow meter 112 and throttle angle sensor 114. The input/output unit 108 also includes an engine speed counter means 160 which comprises an engine speed counter 162 and a timer 163. The engine speed counter 162 is designed to count the crank position signal from the crank angle sensor 110 for a predetermined period of time for deriving an engine speed data N. The input/output unit 108 is further provided with a first up-counter 164, a first comparator 166, a first output register 168, a second up-counter 170, a second comparator 172 and a second output register 174. The first up-counter 164, the first comparator 166 and the first output register 168 constitute a spark advance control section of the input/output unit 108. On the other hand, the second up-counter 170, the second comparator 172 and the second output register 174 constitute a dwell angle control section of the input-/output unit 108.

The first and second up-counters 164 and 170 are designed for counting up the crank position signal $\theta_{pos}$ and output first and second counter signals respectively representative of the counter values. The first up-counter 164 is also receives the crank reference signal $\theta_{ref}$ and responsive to the crank reference signal to be reset the counter value.

The first register 168 receives the spark advance data derived on the basis of the spark advance adjusting parameter and in the process which will be set out below. The first register 168 feeds the spark advance data to the first comparator 166. The first comparator 166 also receives the first counter signal from the first up-counter 164 to compared the counter value of the first up-counter with the set spark advance data to produce a first trigger signal for causing spark ignition. This first trigger signal is also input to the second up-counter 170 and serves as a reset signal for resetting the second counter value. The second counter signal indicative of the second counter value of the second up-counter 170 is comared with a dwell angle data which is set in the second output register 174. When the second counter value of the second up-counter 170 reaches the set dwell angle data as compared, the second comparator 172 output a second trigger signal. As is well known, the electric current is supplied in response to the second trigger signal and terminated in response to the first trigger signal. In response to termination of the electric current supply to an ignition coil 178, spark ignition is initiated.

Figure 11:
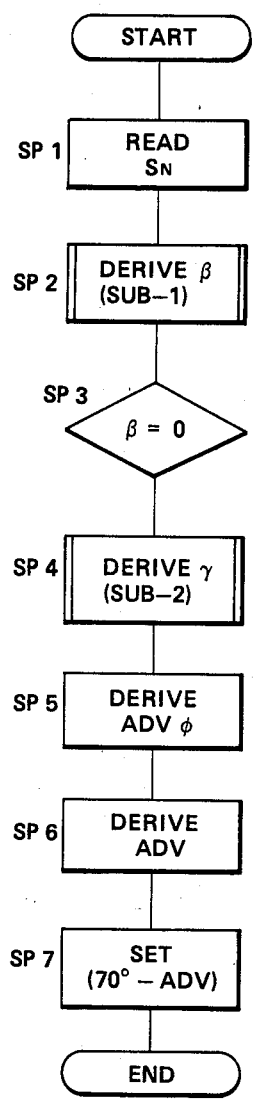
FIG. 11 is a flowchart of a spark ignition timing control main program to be executed by a control unit in the preferred embodiment of the spark ignition timing control system of FIG. 2.
Figure 14:
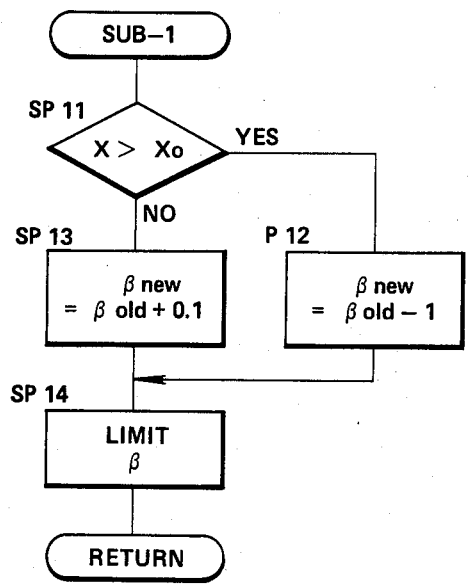
FIG. 14 is a flowchart of a anti-knock spark advance correction value derivation sub-routine to be executed by the control unit in the preferred embodiment of the spark ignition timing control system of FIG. 2.

Practical operation of the spark ignition timing control to be performed in the preferred embodiment of the spark ignition timing control system according to the invention, will be described herebelow with reference to FIGS. 11 to 17. FIG. 11 shows a main control program to be executed for deriving a spark advance. The main control program may be executed repeatedly or cyclically. Immediately after starting execution of the main control program, the knocking condition indicative data is read out at a step SP1. Based on the knocking condition indicative data as read at the step SP1, the anti-knock correction value $\beta$ is derived at a step SP2. The process of derivation of the anti-knock correction value $\beta$ will be described later with reference to FIG. 14. Therefore, in the step SP2, the anti-knock correction value deriving sub-routine of FIG. 14 is executed.

It should be appreciated that, through the shown preferred process incorporate the anti-knock correction value deriving sub-routine in the main control program so that the sub-routine may be triggered at the step SP2, it is also possible to formulate the anti-knock correction value deriving routine as an interrupt program to be executed at a given timing independent of the main control program. In the latter case, it may be practical to execute the anti-knock correction value deriving interrupt program at about every 10 ms.

After deriving the anti-knock correction value $\beta$ at the step SP2, the deriving anti-knock correction value $\beta$ is checked whether it is zero (0) at a step SP3. That is, when the anti-knock correction value $\beta$ is held zero, it means engine knocking level is lower than a given level and thus anti-knock mode control is not necessary. On the other hand, when the anti-knock correction value $\beta$ is other than zero, it means that anti-knock mode spark ignition timing control is required. Therefore, by checking the anti-knock correction value $\beta$ at the step SP3, required control mode is detected.

When the anti-knock correction value $\beta$ as checked at the step SP3 is zero, the MBT mode control is performed. So as to advance the spark advance in the MBT mode control, the MBT mode correction value $\gamma$ is determined at a step SP4. In the step 4, a MBT mode correction value deriving sub-routine which will be discussed later with reference to FIG. 15 is executed for deriving the MBT mode correction value $\gamma$.

It will be appreciated that, similarly to the anti-knock correction value deriving sub-routine, the MBT mode correction value deriving routine may be formulated as an interrupt program to be executed at a given timing independent of the main control program. It is practical timing to execute the MBT mode correction value deriving interrupt program at every 100 ms.

Figure 15:
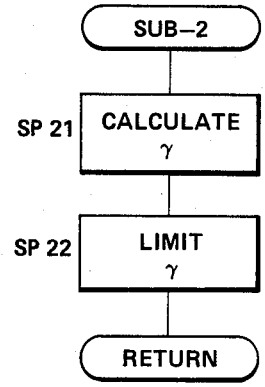
FIG. 15 is a flowchart of a MBT mode spark advance correction value derivation sub-routine to be executed by the control unit in the preferred embodiment of the spark ignition timing control system of FIG. 2.
Figure 12:
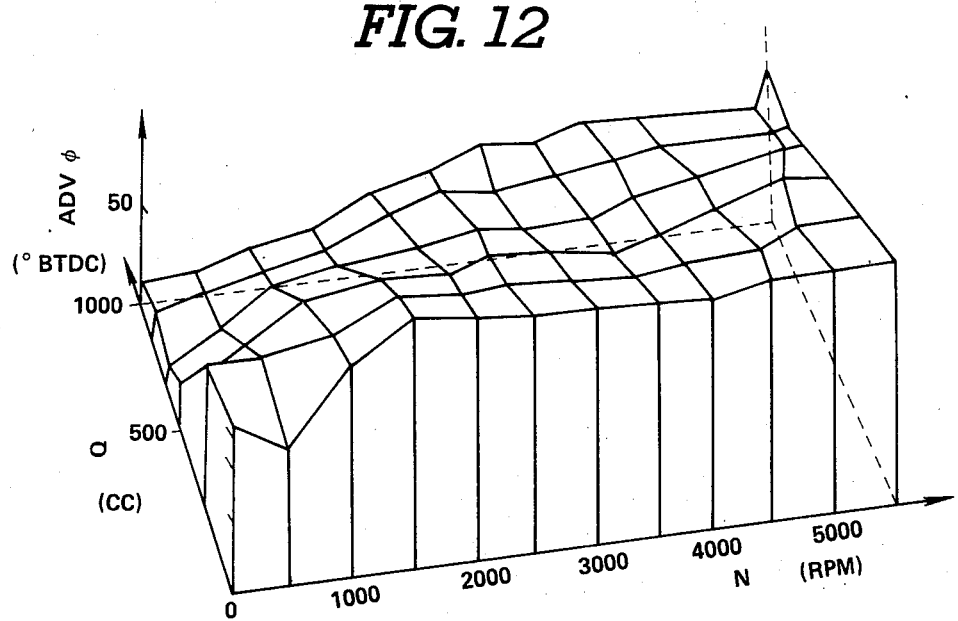
FIG. 12 is an explanatory illustration of a three-dimentional look-up table to be used for determining a basic spark advance in terms of an engine speed N and an intake air flow rate Q.

After returning to the main control program from the MBT mode correction value deriving sub-routine of FIG. 15 or when the anti-knock correction value $\beta$ as checked at the step SP3 is other than zero, process goes to a step SP5. In the step SP5, the basic spark advance is determined utilizing a three dimensional look-up table as shown in FIG. 12. As will be seen from FIG. 12, the look-up table is looked up in terms of the engine speed N and the intake air flow rate Q. Therefore, at the step SP5, the engine speed value N and the intake air flow rate value Q are read from the input/output unit 108. On the basis of the read engine speed value N and the intake air flow rate value Q, table look-up is performed against the table of FIG. 12 to determine the basic spark advance $ADV\phi$. The basic spark advance $ADV\phi$ as derived at the step SP5 is modified with the correction value, i.e. anti-knock correction value $\beta$ or the MBT mode correction value $\gamma$ at the step SP6. In the step SP6, the basic spark advance $ADV\phi$ may be modified with the anti-knock correction value $\beta$ in the anti-knock mode control and with the MBT mode correction value $\gamma$ in the MBT mode control in order to derive spark advance ADV. However, since the MBT mode correction value $\gamma$ is substantially smaller than the anti-knock mode correction value $\beta$, it would also be possible to modify the basic spark advance $ADV\phi$ with a sum of the anti-knock correction value $\beta$ and the MBT mode correction value $\gamma$. Even in this case, since the MBT correction value $\gamma$ is smaller than one-tenth of the anti-knock correction value $\beta$, no significant problem will be arisen. After deriving the spark advance ADV at the step SP6, process goes to a step SP7. In the step SP7, spark advance data to be set in the first output register 168 of the input/output unit 108 is determined by subtracting the spark advance ADV from 70°. At the step SP7, the spark advance data thus derives is transferred to the first output register 168.

Figure 13:
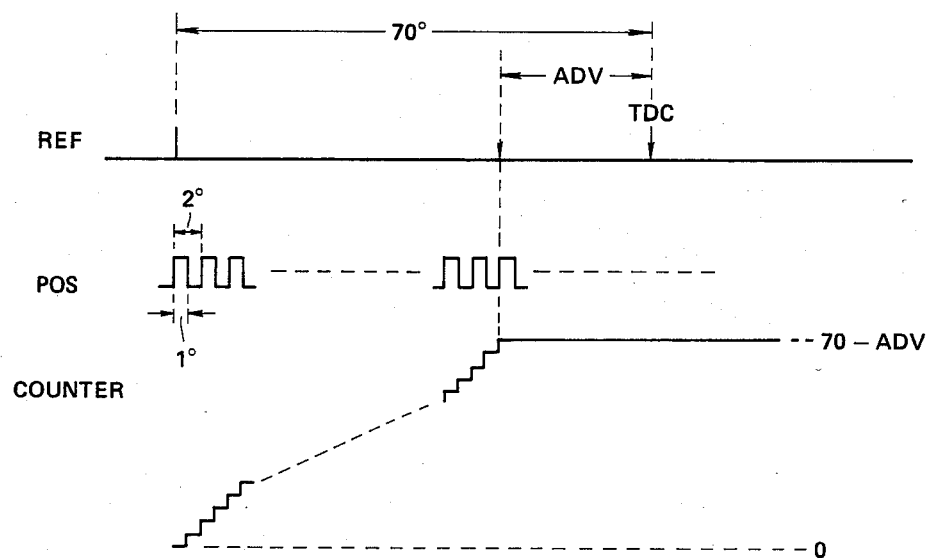
FIG. 13 is a timing chart showing manner of derivation of spark ignition timing which is determined by an input/output unit in the preferred embodiment of the spark ignition timing control system of FIG. 2.
Figure 16:
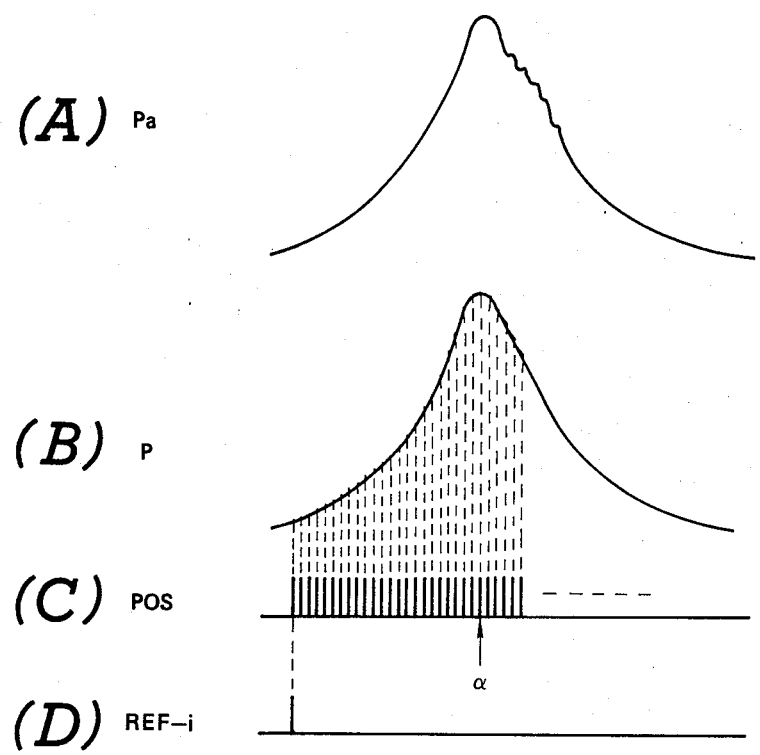
FIG. 16 is a timing chart showing manner of detection of the maximum pressure timing in the engine cylinder.

As set forth above, the spark advance data as set in the first output register 168 is compared with the first counter value of the first up-counter 164 by the first comparator 166. The comparator 166 outputs the first trigger signal SP when the first counter value reaches the set spark advance data value, as shown in FIG. 13. The first trigger signal is fed to the base electrode of a power transistor 181. The power transistor 181 is responsive to the first trigger signal Sp to be turned OFF to induce an induced current in the secondary coil of the ignition coil 178. This induced current has substantially high voltage and serves as an ignition power. The ignition current is then distributed to corresponding one of spark ignition plugs 182a, 182b, 182c, 182d, 182e and 182f via a distributor 184 to initiate spark ignition.

FIG. 14 shows the anti-knock correction value deriving sub-routine for deriving the anti-knock correction value $\beta$. This sub-routine is triggered at the step SP2 of the main control program. At a step SP11, the knocking level X which is represented by the knocking condition indicative signal value $S_N$ is compared with a predetermined knocking threshold value $X_0$. The knocking threshold value $X_0$ represents a predetermined engine knocking level and thus may be set at the trace knocking level where the engine output characteristics becomes optimum. When the knocking level X is smaller than or equal to the knocking threshold value $X_0$, process goes to a step SP13.

The anti-knock correction value $\beta$ is determined as a negative value indicative of the retarding magnitude In the step SP13, the anti-knock correction value $\beta$ is reduced by 0.1°. Namely, the new anti-knock correction value $\beta_{new}$ is calculated by:

$$\beta_{new} = \beta_{old} + 0.1°$$

where
$\beta_{old}$ is the anti-knock correction value derived in immediately proceeding execution cycle of the anti-knock correction value deriving sub-routine.

By this regarding magnitude of the spark advance is gradually reduced. On the other hand, when the knocking level X is greater than the knocking threshold level $X_0$, then process goes to a step SP12 to calculate the anti-knock correction value $\beta$ according to the following equation:

$$\beta_{new} = \beta_{old} - 1°$$

By the process in the step SP12, the retarding magnitude of the spark advance is gradually increased at every cycle of the execution of the anti-knock correction value deriving sub-routine.

After the process in the step SP13 or SP12, the derived anti-knock correction value $\beta$ ($\beta_{new}$) is compared with predetermined retard limits, i.e. $\beta_{max}$ and $\beta_{min}$, at a step SP14. The retard limit $\beta_{max}$ represents the maximum retarding magnitude, e.g. $-10°$. On the other hand, the retard limit $\beta_{min}$ represents the minimum retarding magnitude, e.g. $\theta°$. As will be appreciated, when the anti-knock correction value $\beta$ reaches the minimum retarding magnitude $\beta_{min}$, it will mean termination of the anti-knock mode spark ignition timing control.

If the derived anti-knock correction value $\beta$ is within the range defined by the maximum retarding magnitude $\beta_{max}$ and the minimum retarding magnitude $\beta_{min}$, the derived anti-knock correction value $\beta$ is set as derived. On the other hand, when the derived anti-knock correction value $\beta$ is greater than the maximum retarding magnitude $\beta_{max}$, the derived anti-knock correction value $\beta$ is modifed to the maximum retarding magnitude value $\beta_{max}$. Similarly, when the derived anti-knock correction value $\beta$ is smaller than the minimum retarding magnitude value $\beta_{min}$, the derived anti-knock correction value is modified to the minimum retarding magnitude value $\beta_{min}$.

FIG. 14 shows the MBT mode correction value deriving sub-routine to be triggered at the step SP5 of the main control program. At a step SP21, the MBT mode correction value $\gamma$ is determined according to the following equation:

$$\gamma_{new} = \gamma_{old} + (\theta_{pmax} - K)/M$$

where
$\gamma_{new}$ is new MBT mode correction value
$\gamma_{old}$ is MBT mode correction value derived in the immediately preceding execution cycle of the MBT mode correction value deriving sub-routine
K is a target spark advance magnitude in MBT mode control and M is a constant greater than one (1).

The $\theta_{pmax}$ is calculated in the following process on the basis of the pressure indicative signal Pa from the pressure sensor 108. The pressure indicative signal Pa (FIG. 16(A)) is input to a low-pass filter 186 in the input/output unit 108 to be filted out the high frequency component and outputted in a waveform as shown by FIG. 16(B). The value of the filted pressure indicative signal is analog-to-digital converted into digital signal at the timing of every crank position signal $\theta_{pos}$ (FIG. 16(C)). On the other hand, a counter 188 is provided for counting the crank position signal $\theta_{pos}$ to detect the crank shaft angular position. The counter value of the counter 188 is reset in response to the crank reference position signal $\theta_0$ (FIG. 16(D)) which is produced by the crank shaft reference position detector 116 and is indicative of the predetermined crank angular position, such as 70° BTDC of the No. 1 cylinder. Since the crank reference position signal $\theta_0$ is produced every one cycle of engine revolution, the counter 188 is reset every one cycle of engine revolution cycle. Assuming the crank position signal $\theta_{pos}$ is produced every 2° of crank shaft angular displacement, the counter may counts 360 crank position signals $\theta_{pos}$. In this case, every 60 counts represents interval between BTDC 70° positions of sequentially combustioned cylinders. Therefore, maximum pressure indicative signal value is detected within each 60 count. Also, the crank shaft angular position as represented by the counter value of the counter 188, where the maximum pressure indicative signal value is obtained, is detected. The maximum pressure point $\theta_{pmax}$ is then calculated according to the following equation:

$$\theta_{pmax} = 2\alpha - 70$$

where
 $\alpha$ is a angle to the angular position where the maximum pressure indicative signal value is obtained from the crank angular position from which the 60 count begins.

As will be appreciated herefrom, during MBT mode spark ignition control, the MBT mode correction value $\gamma$ is gradually increased by the value $(\theta_{pmax} K)/M$ at every cycle of execution of the MBT mode correction value deriving sub-routine. The target spark advance magnitude K will be determined at the crank shaft angular position where the engine output torque becomes maximum. For example, the target spark advance magnitude K will be set in a range of 10° to 20° after top dead center (ATDC).

After the process in the step SP21, the derived MBT mode correction value $\gamma$ ($\gamma$new) is compared with a predetermined maximum advancing magnitude $\gamma_{max}$, e.g. +10°, at a step SP22. When the derived MBT mode correction value is smaller than or equal to the maximum advancing magnitude value $\gamma_{max}$, the derived MBT mode correction value $\gamma$ is set as derived. On the other hand, the derived MBT correction value $\gamma$ is greater than the maximum advancing magnitude value $\gamma_{max}$, the derived MBT mode correction value $\gamma$ is modified at the maximum advancing magnitude value $\gamma_{max}$.

Figure 17:
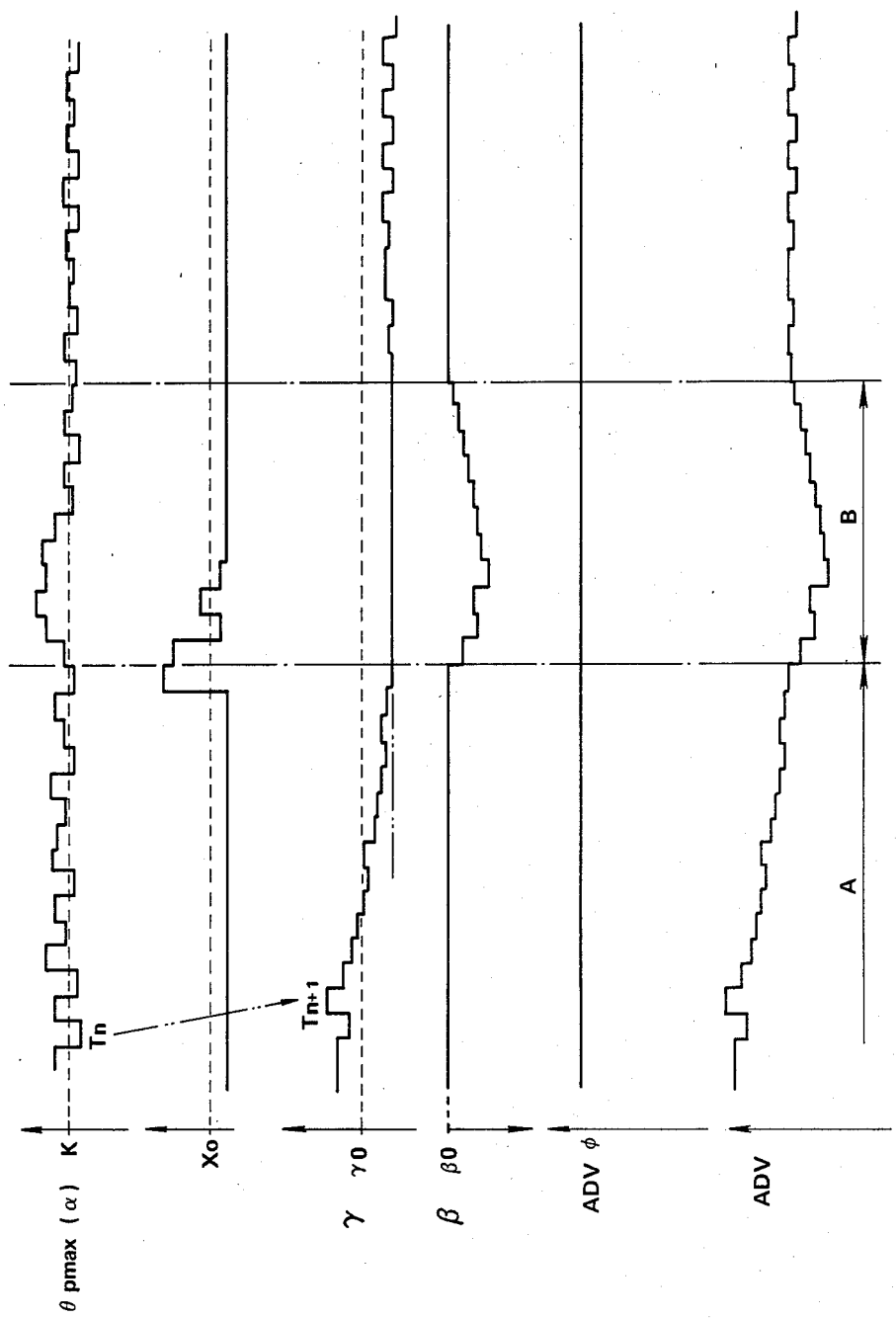
FIG. 17 is a timing chart showing spark ignition timing control operation to be performed by the preferred embodiment of the spark ignition control system of FIG. 2.

The variation of the spark advance to be derived through the foregoing process is shown in a form of timing chart in FIG. 17. As will be seen from FIG. 17, the MBT mode correction value $\gamma$ is determined on the basis of the maximum pressure point $\theta_{pmax}$ in the immediate preceding interval Tn between occurence of the crank reference signals $\theta_{ref}$, the MBT mode correction value $\gamma$ of the current interval Tn+1 is determined. Similarly, based on the engine knocking level X of the immediately preceding interval, the anti-knock correction value is determined.

As set forth above and as will be seen from FIG. 17, the MBT mode spark ignition timing control is performed as long as the anti-knock correction value $\beta$ is held at the minimum retarding magnitude value, i.e. zero while the knocking level X is held lower than or equal to the knocking threshold value $X_0$. In the MBT mode control, the MBT mode correction value $\gamma$ is so adjusted as to make the target spark advance K coincide with the $\theta_{pmax}$ point. In FIG. 17, the period where the MBT mode spark ignition timing control is peformed is referred to as period A.

When the knocking level X becomes in excess of the knocking threshold level $X_0$, the anti-knock mode spark ignition control is initiated. During the period B in FIG. 17 in which the anti-knock mode control is performed, the spark advance is cyclically retarded with the anti-knock correction value $\beta$.

In the preferred embodiment of the spark ignition timing control system, the MBT mode correction value $\gamma$ immediately before initiation of the anti-knock mode spark ignition control, is held during the period B where the anti-knock mode spark ignition timing control is performed. As set forth, since the spark advance, in the MBT mode control, is adjusted approximately at the target spark advance K, the held MBT mode correction value $\gamma$ indicate the correction value to modify the basic spark advance to be derived on the basis of the engine speed N and the intake air flow rate Q close to the target spark advance value K.

In practice, the MBT mode correction value $\gamma$ may be stored in an appropriate memory address of RAM 106 or a register (not shown). The content of the memory address is held at the MBT mode correction value $\gamma$ immediately preceding the anti-knock mode control. This MBT mode correction value $\gamma$ as stored in the memory address will be read out upon resuming of the MBT mode control in response to termination of the anti-knock mode control. With this process, the spark advance to be derived upon resumption of the MBT mode control can be determined close to the target spark advance value K. Therefore, as soon as engine knocking is successfully suppresed, the spark advance is resumed to approximately the optimum value in view of the engine performance immediately. This will significantly improve the transition characteristics of switching of the spark ignition timing control mode from the anti-knock mode control to the MBT mode control.

Figure 18:
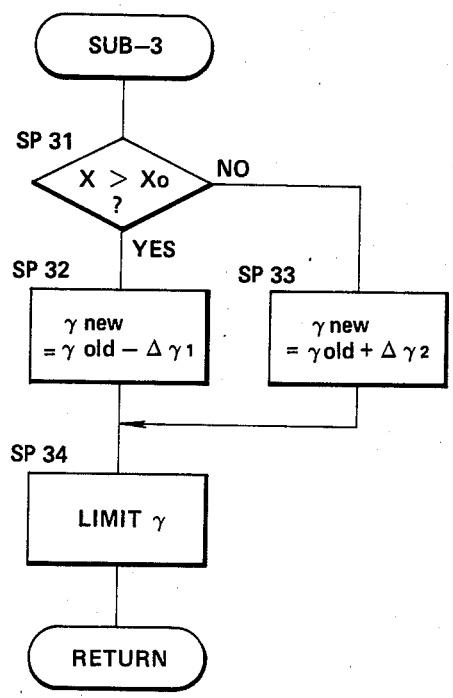
FIG. 18 is a flowchart showing another MBT correction value deriving routine which is adapted to modify a MBT mode correction value during an anti-knock mode spark ignition timing control.

FIG. 17 shows another preferred process in deriving the MBT mode correction value deriving sub-routine. The sub-routine shown in FIG. 17 is set as a parallel routine to the routine of FIG. 15. Namely, the MBT correction value deriving sub-routine of FIG. 18 is designed to be executed during anti-knock mode control for adjusting the MBT correction value even during the anti-knock mode control. Therefore, in order to enable this, additional step for triggering the MBT mode correction value deriving sub-routine of FIG. 18 will be inserted between the step SP3 and SP4 so that it may be triggered when the anti-knock correction value $\beta$ as checked at the step SP3 is other than zero.

In the shown sub-routine, the knocking level X is compared with the knocking threshold $X_0$ at a step SP31, so as to judge whether the spark advance retarding magnitude has to be increased or not. When the knocking level X as checked at the step SP31 is greater than the the knocking threshold $X_0$, then process goes to a step SP32 to calcualte new MBT mode correction value $\gamma_{new}$ based on the old MBT correction value $\gamma_{old}$ derived in the immediately preceding execution cycle, according to the following equation:

$$\gamma_{new} = \gamma_{old} - \Delta\gamma_1$$

where $\Delta\gamma_1$ is an experimentarily obtained predetermined value.

As will be appreciated herefrom, while the engine knocking level X is heavier than the knocking threshold $X_0$, the MBT mode correction value $\gamma$ is gradually reduced by $\Delta\gamma_1$. The MBT correction value $\gamma$ stored in the memory during anti-knock mode spark ignition control, is gradually reduced as long as the engine knocking is heavier than the predetermined level which is represented by the knocking threshold. Reducing magnitude of the MBT correction value $\gamma$ is variable depending upon the length of the period where the engine knocking heavier than the predetermined level is maintained. This may fits the spark advance upon resumption of the MBT mode control to the actual engine driving condition.

Namely, when the engine knocking heavier than the predetermined level is maintained relatively loner period, it means that the engine is in a condition to easily cause engine knocking. In such engine condition, it would be better to resume MBT mode control at relatively smaller advance magnitude of spark advance so as to prevent the switching of the control mode from causing hunting.

On the other hand, when the engine knocking level X as checked at the step SP31 is smaller than or equal to the knocking threshold $X_0$, the new MBT mode correction value $\gamma_{new}$ is derived from the following equation, at a step SP33:

$$\gamma_{new} = \gamma_{old} + \Delta\gamma\text{hd } 2$$

where $\Delta\gamma_2$ is an experimantarily obtained predetermined value.

The condition where the engine knocking level X is smaller than or equal to the knocking threshold $X_0$ occurs during transition of switching control mode from anti-knock mode to the MBT mode. Namely, even after the engine knocking is suppressed below the predetermined knocking level, e.g. trace knocking level, anti-knock mode control is maintained until the anti-knock correction value $\beta$ becomes zero. Therefore, this period may be appreciated as the switching transition for switching the control mode from the anti-knock mode to the MBT mode. During this period, the MBT mode correction value $\gamma$ which is regarded by the magnitude of $\Delta\gamma_1$ while the engine knocking heavier than the predetermined level is maintained, is better to be recovered. This recovery of the reduced MBT mode correction value can be down in the process of the step SP33.

After derivation of the MBT mode correction value $\gamma$ at the step SP32 or SP33, the process goes to a step SP34 to limit the MBT mode correction value in a predetermined range, +10° to −10°. The process to limit the MBT correction value $\gamma$ is identical to that discussed about the step SP14 of the former embodiment.

Figure 19:
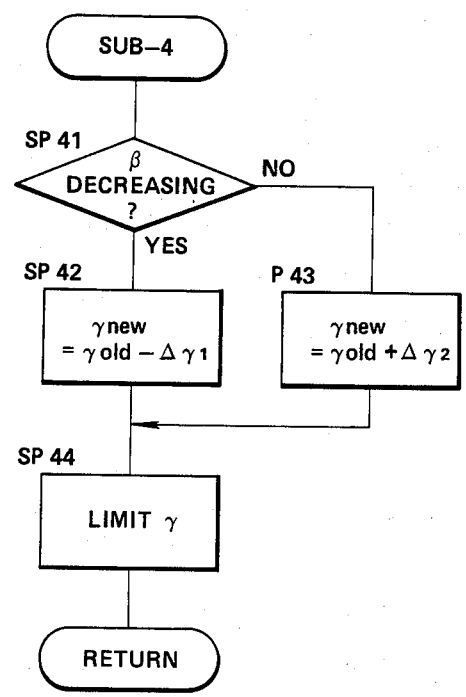
FIG. 19 is a flowchart showing a modification of another MBT correction value deriving routine of FIG. 17 which is adapted to modify a MBT mode correction value during an anti-knock mode spark ignition timing control.

FIG. 19 shows a modification of the MBT correction value deriving sub-routine to be executed while the anti-knock mode control is performed. In this program, switching transition from the anti-knock mode control to the MBT mode control is detected by monitoring the anti-knock correction value $\beta$.

Therefore, the step SP31, in which the engine knocking level X is compared with the knocking threshold $X_0$ to detect the transition of control mode switching from the anti-knock mode to the MBT mode, is replaced with a step SP41, in which the anti-knock correction value $\beta$ is checked whether it is decreasing or increasing. This may be performed by checking whether the step SP12 or SP13 is performed during execution of the anti-knock correction value deriving sub-routine of FIG. 14.

When the anti-knock correction value is increasing as checked at the step SP41, the process goes to a step SP42 to calculate new MBT mode correction value $\gamma_{new}$ based on the old MBT correction value $\gamma_{old}$ derived in the immediately preceding execution cycle, according to the following equation:

$$\gamma_{new} = \gamma_{old} - \Delta\gamma_1$$

As will be appreciated herefrom, while the anti-knock correction value $\beta$ is increasing, it means that the engine knocking level is heavier than the predetermined knocking level. Therefore, the MBT mode correction value $\gamma$ is gradually reduced by $\Delta\gamma_1$.

On the other hand, when the anti-knock correction value $\beta$ as checked at the step SP41 is decreasing, it means that the spark ignition timing control is in switching transition for switching the mode from the anti-knock mode to the MBT mode. At this time, the new MBT mode correction value $\gamma_{new}$ is derived from the following equation, at a step SP43:

$$\gamma_{new} = \gamma_{old} + \Delta\gamma_2$$

After derivation of the MBT mode correction value $\gamma$ at the step SP42 or SP43, the process goes to a step SP44 to limit the MBT mode correction value in a predetermined range, +10° to −10°. The process to limit the MBT correction value $\gamma$ is identical to that discussed about the step SP14 of the former embodiment.

Figure 20:
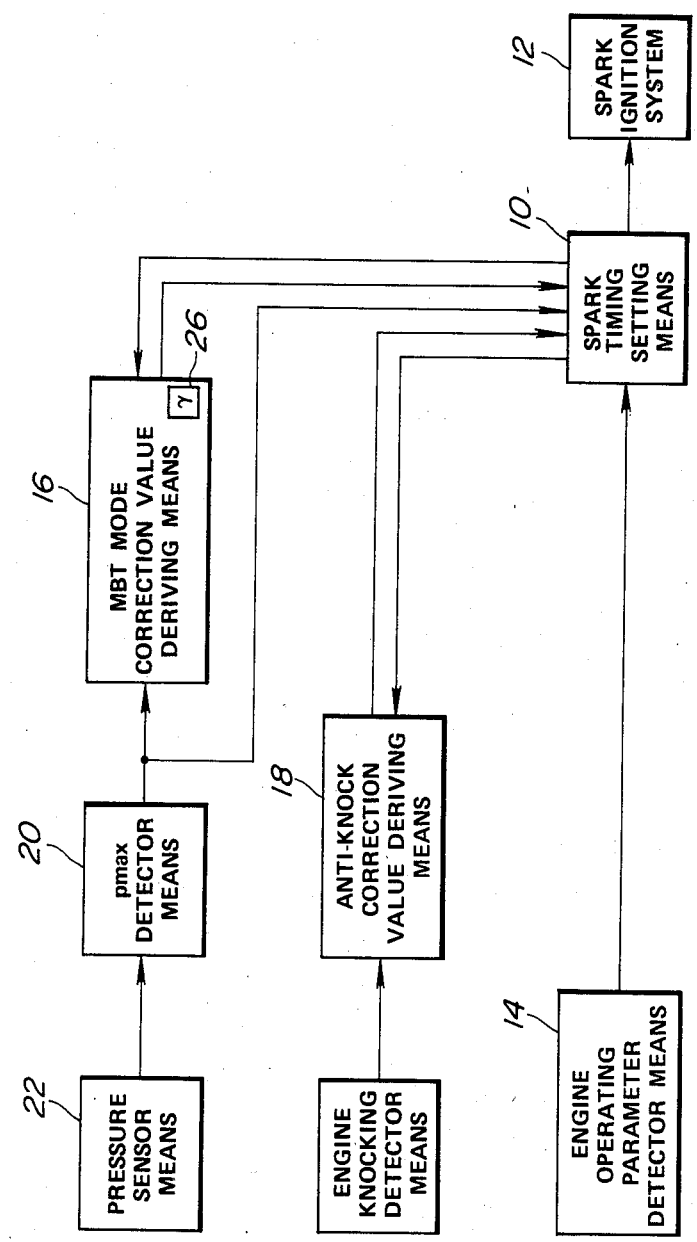
FIG. 20 is a schematic discrete form block diagram of another preferred embodiment of the spark ignition timing control system according to the invention.
Figure 21:
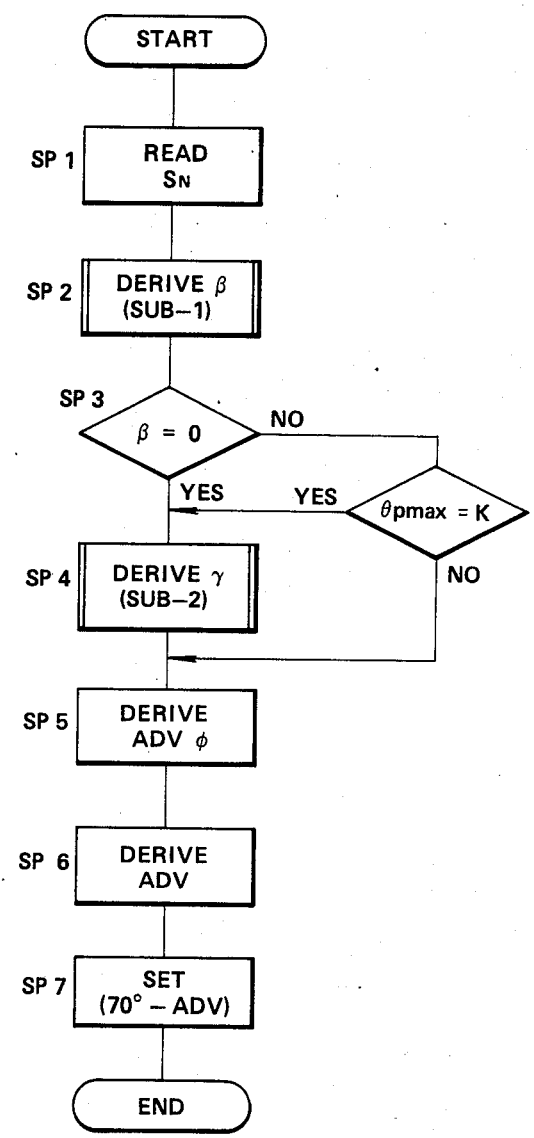
FIG. 21 is a flowchart of another embodiment of a spark ignition timing control program which is also executed by the control unit of the preferred embodiment of the spark ignition timing control system of FIG. 20.

FIG. 20 shows another embodiment of a spark ignition timing control system according to the present invention. FIG. 21 shows a flowchart of a main control program to be executed in the spark ignition timing control system of FIG. 20.

In the following discussion for the preferred embodiment of the spark ignition timing control system of FIGS. 20 and 21, the system components and process steps which are identical or substantially similar to that of the foregoing embodiment, will be represented by the same reference numerals to that of the former embodiments. Since such common features have already disclosed in detail, the detailed description of those features will be neglected from the following disclosure.

As shown in FIG. 21, a step SP8 is inserted for comparing the angular values maximum pressure point $\theta_{pmax}$ and a target advance point corresponding to the target advance magnitude K. The step SP8 is performed when the anti-knocl correction value $\beta$ as checked at the step SP3, is other than zero. When the angular value of the maximum pressure point $\theta_{pmax}$ is smaller than or equal to the angular value of the target advance point, process goes to the step SP4 to derive the MBT mode correction value to perform MBT mode spark ignition timing control. On the other hand, when the angular value of the maximum pressure point $\theta_{pmax}$ is greater than the angular value of the target advance point K, the anti-knock mode is maintained and thus process goes to the step SP5 skipping the step SP4.

Namely, when the angular value $\theta_{pmax}$ is smaller than or equal to the angular value of the target advance point K, the spark advance is retarded even in the MBT mode control. Therefore, in which condition, the anti-knock mode control is terminated to resume the MBT mode control. As will be appreciated, upon resumption of the MBT mode control, the MBT mode correction value which is derived in immediately advance of switching of the control mode from the MBT mode to the anti-knock mode and is held in the memory during the period in which the anti-knock mode control is performed, or which is derived in immediately advance of switching of the control mode from the MBT mode to the anti-knock mode, modified through the process shown in FIGS. 18 and 19 and held in the memory during the period in which the anti-knock mode control is performed, is used for obtaining better control mode transition characteristics.

So as to enable the aforementioned process, the spark ignition timing control system of this embodiment is composed as shown in FIG. 20. As will be seen herefrom, the spark timing setting means 10 is connected to the $\theta_{pmax}$ detector means for detecting the angular value of the $\theta_{pmax}$ point smaller than or equal to the angular position of the target spark advance point K. Since the $\theta_{pmax}$ point detector means produces the difference indicative signal between the $\theta_{pmax}$ point and the target spark advance point (MBT point), the spark timing setting means receives the difference indicative signal in order to detect the angular value of the $\theta_{pmax}$ point smaller than or equal to the angular position of the target spark advance point K. Namely, when the value of the difference indicative signal is smaller than or equal to zero, it means that the angular value of the $\theta_{pmax}$ point smaller than or equal to the angular position of the target spark advance point K. Therefore, the spark timing setting means switches the control mode from the anti-knock mode to the MBT mode when the difference indicative signal value is smaller than or equal to zero.

It should be appreciated that, although the shown embodiment employs the engine knocking detector means which detects the engine knocking condition on the basis of the pressure indicative signal value of the pressure sensor, it would be possible to provide a sort of vibration sensor for solely monitoring the engine knocking condition. Such knock sensors comprising vibration sensors have been disclosed in the U.S. Pat. No. 4,374,472, issued on Feb. 23, 1983, to Toshifumi NISHIMURA and commonly assigned to the assignee of the present invention, for example. The disclosure of the U.S. Pat. No. 4,374,472 concerning the engine knocking sensor will be herein incorporated by reference for the sake of disclosure.

Therefore, all of the objects and advantages sought for the invention can be fulfilled.

What is claimed is:

1. A spark ignition timing control system comprising:
   first means for causing spark ignition in an engine combustion cylinder in response to a trigger signal;
   second means for deriving a basic spark advance on the basis of a preselected first engine operation parameter;
   third means for deriving a first correction value for modifying said basic spark advance so as to adjust a crank shaft angular position, at which a maximum pressure in an engine combustion chamber is obtained, toward a predetermined target angular position;
   fourth means for deriving a second correction value for retarding said basic spark advance by a predetermined magnitude for suppressing engine knocking, said fourth means; and
   fifth means for deriving a spark advance on the basis of said basic spark advance and one of said first and second correction value, said fifth means normally selecting said first correction value for modifying said basic spark advance in a first mode and responsive to the engine knocking heavier than a predetermined level to select said second correction value for modifying said basic spark advance in a second mode and to hold said first correction value derived immediately before the engine knocking heavier than said predetermined value is detected, and said fifth means being responsive to resumption of said first mode operation to modify said basic spark advance with said first correction value held during said second mode operation, and said fifth means producing said trigger signal when the crank shaft reaches an angular position identified by said spark advance.

2. A spark ignition timing control system as set forth in claim 1, wherein said third means derives said first correction value on the basis of a angular difference between said crank shaft angular position and said predetermined target angular position and the first correction value derived in an immediately preceding operation cycle of said third means.

3. A spark ignition timing control system as set forth in claim 2, wherein said third means derives said first correction value $\gamma$ by the following equation:

$$\gamma = \gamma_{old} + \Delta\theta/M$$

where
   $\gamma_{old}$ is the first correction value derived in an immediately preceding operation cycle of said third means;
   $\Delta\theta$ is the angular difference between said crank shaft angular position and said predetermined target angular position; and
   M is a constant having a value greater than or equal to zero.

4. A spark ignition timing control system as set forth in claim 1, wherein said fourth means derives said second correction value by reducing a predetermined first value from the second correction value derived in the immediately preceding operation cycle of said fourth means while said engine knocking level is held heavier than said predetermined level and by added a predetermined second value to said second correction value derived in the immediately preceding operation cycle of said fourth means while said engine knocking level is held lower than or equal to said predetermined level.

5. A spark ignition timing control system as set forth in claim 4, wherein said second correction value is a negative value, absolute value of which is increased by said first value at every operation cycle of said fourth means while said engine knocking is heavier than said predetermined level and is decreased toward zero while said engine knocking is lighter than or equal to said predetermined level.

6. A spark ignition timing control system as set forth in claim 5, wherein said fifth means is responsive to said second correction value for resuming said first mode operation.

7. A spark ignition timing control system as set forth in claim 1, wherein said fifth means modifies said held first correction value by a given magnitude at every operation cycle thereof during said second mode operation.

8. A spark ignition timing control system as set forth in claim 7, wherein said fifth means is responsive to engine knocking heavier than said predetermined level to reduce said held first correction value by a given third value and to increase said held first correction value by a given fourth value when engine knocking is lighter than or equal to said predetermined level.

9. A spark ignition timing control system as set forth in claim 1, wherein said fifth means compares a first angular value representative of the crank shaft angular position where the maximum pressure in the combustion cylinder is obtained, with a second angular value representative of the crank shaft angular position corresponding to the target spark advance point and switching control mode from said second mode to said first mode when said first angular value is smaller than or equal to said second angular value, regardless of the engine knocking level.

10. A spark ignition timing control system as set forth in claim 9, wherein said third means derives said first correction value on the basis of a angular difference between said crank shaft angular position and said predetermined target angular position and the first correction value derived in an immediately preceding operation cycle of said third means.

11. A spark ignition timing control system as set forth in claim 10, wherein said third means derives said first correction value $\gamma$ by the following equation:

$$\gamma = \gamma_{old} + \Delta\theta/M$$

where
- $\gamma_{old}$ is the first correction value derived in an immediately preceding operation cycle of said third means;
- $\Delta\theta$ is the angular difference between said crank shaft angular position and said predetermined target angular position; and
- M is a constant having a value greater than or equal to zero.

12. A spark ignition timing control system as set forth in claim 9, wherein said fourth means derives said second correction value by reducing a predetermined first value from the second correction value derived in the immediately preceding operation cycle of said fourth means while said engine knocking level is held heavier than said predetermined level and by added a predetermined second value to said second correction value derived in the immediately preceding operation cycle of said fourth means while said engine knocking level is held lower than or equal to said predetermined level.

13. A spark ignition timing control system as set forth in claim 12, wherein said second correction value is a negative value, absolute value of which is increased by said first value at every operation cycle of said fourth means while said engine knocking is heavier than said predetermined level and is decreased toward zero while said engine knocking is lighter than or equal to said predetermined level.

14. A spark ignition timing control system as set forth in claim 13, wherein said fifth means is responsive to said second correction value for resuming said first mode operation.

15. A spark ignition timing control system as set forth in claim 9, wherein said fifth means modifies said held first correction value by a given magnitude at every operation cycle thereof during said second mode operation.

16. A spark ignition timing control system as set forth in claim 15, wherein said fifth means is responsive to engine knocking heavier than said predetermined level to reduce said held first correction value by a given third value and to increase said held first correction value by a given fourth value when engine knocking is lighter than or equal to said predetermined level.

17. A spark ignition timing control system for an automotive internal combustion engine having a plurality of combustion chambers, comprising:
- a crank angle sensor monitoring an angular position of a crank shaft of said engine to produce a crank position signal at every given unit angle of crank shaft angular displacement and a crank reference signal at every predetermined angular position of said crank shaft;
- a pressure sensor for monitoring pressure in said combustion chambers and producing a pressure indicative signal;
- a knocking detector receiving said pressure indicative signal and detecting engine knocking level to produce an engine knocking level indicative signal;
- a detector for detecting preselected basic spark advance control parameter for producing a basic spark advance control parameter indicative signal;
- first means for causing spark ignition in each of said engine combustion cylinders in order in response to a trigger signal;
- second means for deriving a basic spark advance on the basis of a preselected basic spark advance control parameter indicative signal value;
- third means for deriving a first correction value for modifying said basic spark advance so as to adjust a crank shaft angular position, at which a maximum pressure in an engine combustion chamber is obtained, toward a predtermined target angular position;
- fourth means, active while said engine knocking indicative signal value is maintained greater than a predetermined threshold value, for deriving a second correction value depending upon for retarding said basic spark advance by a predetermined magnitude for suppressing engine knocking; and
- fifth means for deriving a spark advance on the basis of said basic spark advance and one of said first and second correction value, said fifth means normally selecting said first correction value for modifying said basic spark advance in a first mode and responsive to the engine knocking indicative signal value greater than said threshold value to select said second correction value for modifying said basic spark advance in a second mode and to hold said first correction value derived immediately before the engine knocking indicative signal value greater than said threshold value is detected, and said fifth means being responsive to resumption of said first mode operation from said second mode to modify said basic spark advance with said first correction value held during said second mode operation, and said fifth means producing said trigger signal when the crank shaft reaches an angular position identified by said spark advance.

18. A spark ignition timing control system as set forth in claim 17, wherein said third means derives said first correction value on the baiss of a angular difference between said crank shaft angular position and said predetermined target angular position and the first correction value derived in an immediately preceding operation cycle of said third means.

19. A spark ignition timing control system as set forth in claim 18, wherien said third means derives said first correction value $\gamma$ by the following equation:

$$\gamma = \gamma_{old} + \Delta\theta/M$$

where $\gamma_{old}$ is the first correction value derived in an immediately preceding operation cycle of said third means;

$\Delta\theta$ is the angular difference between said crank shaft angular position and said predetermined target angular position; and M is a constant having a value greater than or equal to zero.

20. A spark ignition timing control system as set forth in claim 17, wherein said fourth means derives said second correction value by reducing a predetermined first value from the second correction value derived in the immediately preceding operation cycle of said fourth means while said engine knocking level is held heavier than said predetermined level and by added a predetermined second value to said second correction value derived in the immediately preceding operation cycle of said fourth means while said engine knocking level is held lower than or equal to said predetermined level.

21. A spark ignition timing control system as set forth in claim 20, wherein said second correction value is a negative value, absolute value of which is increased by said first value at every operation cycle of said fourth means while said engine knocking is heavier than said predetermined level and is decreased toward zero while said engine knocking is lighter than or equal to said predetermined level.

22. A spark ignition timing control system as set forth in claim 21, wherein said fifth means is responsive to said second correction value for resuming said first mode operation.

23. A spark ignition timing control system as set forth in claim 17, wherein said fifth means modifies said held first correction value by a given magnitude at every operation cycle thereof during said second mode operation.

24. A spark ignition timing control system as set forth in claim 23, wherein said fifth means is responsive to engine knocking heavier than said predetermined level to reduce said held first correction value by a given third value and to increase said held first correction value by a given fourth value when engine knocking is lighter than or equal to said predetermined level.

25. A spark ignition timing control system as set forth in claim 17, wherein said fifth means compares a first angular value representative of the crank shaft angular position where the maximum pressure in the combustion cylinder is obtained, with a second angular value representative of the crank shaft angular position corresponding to the target spark advance point and switching control mode from said second mode to said first mode when said first angular value is smaller than or equal to said second angular value, regardless of the engine knocking level

* * * * *